M. D. J. G. BARDOWICK.
POTATO HARVESTING MACHINE.
APPLICATION FILED APR. 25, 1922.
1,419,800.
Patented June 13, 1922.
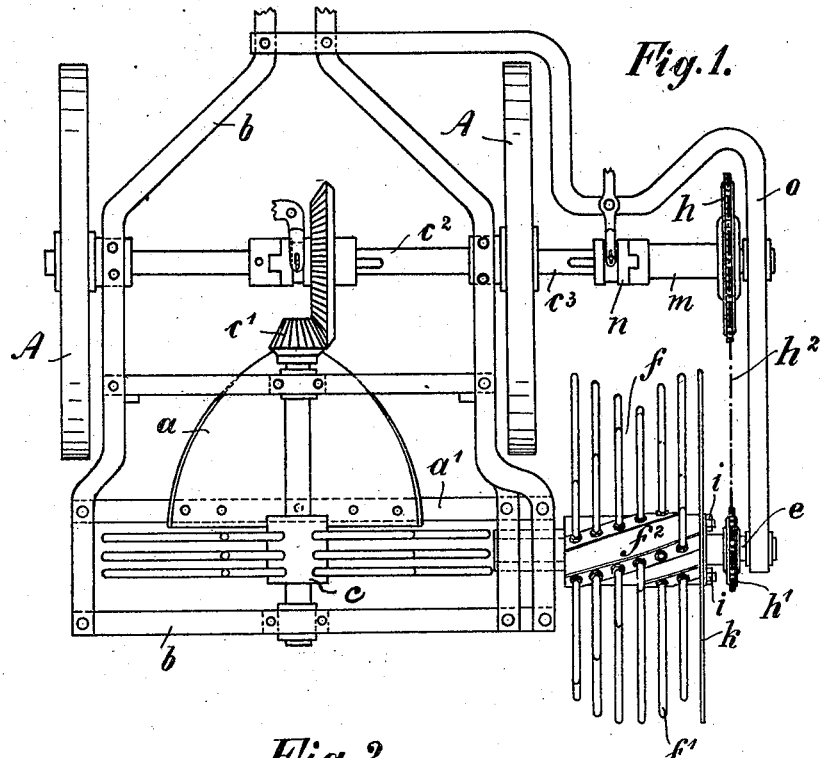
Fig. 1.
Fig. 2.
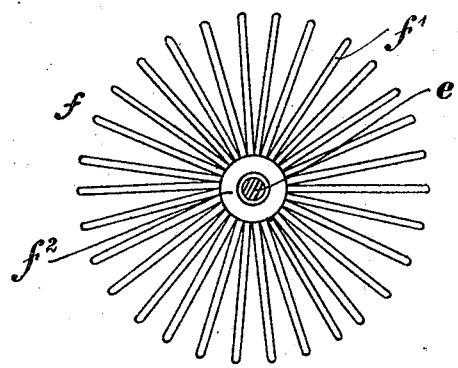
Inventor:
M.D.J.G. Bardowick
By Langner, Parry, Card + Langner
Attys.

UNITED STATES PATENT OFFICE.

MARTIN DIEDRICH JAKOB GOTTLIEB BARDOWICK, OF DEINSTE, NEAR STADE, GERMANY.

POTATO-HARVESTING MACHINE.

1,419,800.  Specification of Letters Patent. Patented June 13, 1922.

Application filed April 25, 1922. Serial No. 556,386.

*To all whom it may concern:*

Be it known that I, MARTIN DIEDRICH JAKOB GOTTLIEB BARDOWICK, citizen of Germany, residing at Dlinste, near Stade, Germany, have invented certain new and useful Improvements in a Potato-Harvesting Machine (for which I have filed applications in Germany on July 22, 1919; in Austria on December 10, 1921; in Hungary on December 15, 1921, and in Czecho-Slovakia on December 15, 1921), of which the following is a specification.

The present invention refers to a potato digging or harvesting machine of that kind, in which there is a rotatable digger operating in the hinder part of the machine and a delivering wheel arranged laterally to the digger and rotating in a plane parallel to the direction of the track. Potato harvesting machines of this kind are known, the delivering wheel consisting of series of blades or arms distributed on a drum or cylinder in rows parallel to the axis. The potatoes, raised by the digger, which rotates about an axis parallel to the direction of the track, are thrown between the arms or blades of the delivery wheels, which are intended to give them a backward direction and deliver them in rows parallel to the direction of the track. The blades or arms being arranged in rows, the potatoes are not always caught up by blades but frequently are flung between the rows without touching any blade and are finally caught up by a dash wheel, arranged at the end of the shaft and adapted to prevent the dirt or earth from being cast on potatoes previously delivered. The main drawback of this kind of machine is the fact that the potatoes will be laid down irregularly, and the delivering wheel has to be driven at a considerable speed, owing to which there is the danger that frequently potatoes are cut or broken when struck by the blades or arms.

To avoid these drawbacks the blades are not distributed in rows parallel to the axis of the delivery wheel, but in rows arranged at an angle, that is to say, in rows following helical lines about the drum which forms the boss for the wheel. These helical lines are so shaped and have at least such length that on the face of wheel the arms will be equally distributed in a circle about the boss, so that in this view the last arm of one row will appear at the same distance from the first arm of the next following row as the arms of each row are apart from one another.

In the drawing Fig. 1 is a plan of a potato harvesting machine, having a delivery wheel constructed according to the present invention.

Fig. 2 is the end view of the delivery wheel.

In the machine shown a shoved $a$ is fixed to a frame $b$ by a curved yoke $a'$ in front of the rotatable digger $c$, which by conical wheels $c'$ is driven from the road wheels A. The axle $c^2$ of the road wheels has a prolongation $c^3$ on one side of the machine and with its utmost end is journaled in a bracket $o$ and loosely carries a chain wheel $h$, the boss $m$ of which is prolonged inwardly and can be connected with the axle-prolongation $c^3$ by a clutch $n$. The frame or bracket $o$ is connected at one end with the main frame $b$ and in its outer end a shaft $e$ is journaled which is also journaled in the main frame $b$. On the shaft $e$ is mounted a drum $f^2$ to which blades or arms $f'$ are attached. These arms together with the drum $f^2$ constitute the delivery wheel $f$, which is so situated that the potatoes thrown up by the digger $c$ will be caught by the arms $f'$. Next to the delivery wheel $f$ a chain wheel $h'$ is mounted on the shaft $e$ in the plane of the chain wheel $h$. By a chain $h^2$ power is transmitted to the shaft $e$ and thus to the delivery wheel $f$ from the axle $c^2$ when the clutch $n$ is thrown into gear. The arms $f'$ are attached to the boss $f^2$ along helical lines, as may be clearly gathered from Fig. 1, in such manner that the angle between the radial plane of the last arm of any row and the radial plane of the first arm of the next following row is equal to the angle between the radial planes of the consecutive arms of each row, that is to say, in the end view of the delivery wheel all arms $f'$ appear equally distributed about the boss $f^2$, as will be clearly understood from Fig. 2. Thus the potatoes, dug by the shovel $a$ and the digger $c$, are thrown up laterally by this said digger in between the rows of arms of the delivery wheel. They are caught up by these arms so that there is no possibility of potatoes flying through the rows to the end of the wheel and forming irregular or uneven rows on the ground. If found desirable in order to avoid earth or dirt to be thrown right through the delivery wheels between the arms a dash-screen or -disk $k$ or the like may be mounted by screws $i$ at the end of the delivery wheel.

As has been explained the advantage of the improved delivery wheel is the fact that the potatoes will be easily distributed on the ground behind the delivery wheel. There is another advantage consisting therein that the power for driving the delivery wheel need not be so great as heretofore, because formerly it was usual to allow the delivery wheel to run at a considerable speed so as to catch hold of as many potatoes as possible by the arms. In the improved delivery wheel it need not be apprehended that potatoes might miss the arms, and therefore the wheel can be driven at a low speed. The gearing $h$, $h'$, $h^2$ described above may even be dispensed with, in which case the delivery wheel may be allowed to rotate merely by the fact of the ends of the arms contact with the ground on which the potatoes are to be laid down. Thus the delivery wheel will be merely rolling along without being operated upon positively by any gearing.

I claim:

1. A potato harvesting machine, comprising a rotatable digger arranged to rotate in a plane transverse to the direction of movement of the machine, and a delivery wheel journaled at right angles to the digger and provided with rows of blades, the blades being mounted in rows on lines running helically about the axis of rotation.

2. A potato harvesting machine, comprising a rotatable digger arranged to rotate in a plane transverse to the direction of movement of the machine, and a delivery wheel journaled at right angles to the digger and provided with rows of blades, the blades being mounted in rows on lines running helically about the axis of rotation, the arms being so distributed that the angle between the radial plane of the last arm of any row and the radial plane of the first arm of the next following row is equal to the angle between the radial planes of the consecutive arms of each row.

MARTIN DIEDRICH JAKOB GOTTLIEB BARDOWICK.